United States Patent
Arduino et al.

(10) Patent No.: US 10,654,535 B2
(45) Date of Patent: May 19, 2020

(54) SYSTEM AND CORRESPONDING PROCESS FOR ASSEMBLING TOGETHER TWO COMPONENTS ON A VEHICLE-BODY ASSEMBLY LINE

(71) Applicant: Comau S.p.A., Grugliasco (Turin) (IT)

(72) Inventors: Stefano Arduino, Grugliasco (IT); Giovanni Di Stefano, Grugliasco (IT); Valeria Serpi, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 0 days.

(21) Appl. No.: 15/770,562

(22) PCT Filed: Oct. 27, 2016

(86) PCT No.: PCT/IB2016/056454
§ 371 (c)(1),
(2) Date: Apr. 24, 2018

(87) PCT Pub. No.: WO2017/072682
PCT Pub. Date: May 4, 2017

(65) Prior Publication Data
US 2019/0054967 A1 Feb. 21, 2019

(30) Foreign Application Priority Data
Oct. 27, 2015 (EP) .................................... 15191738

(51) Int. Cl.
*B62D 65/02* (2006.01)
*C09J 5/06* (2006.01)
(Continued)

(52) U.S. Cl.
CPC .............. *B62D 65/02* (2013.01); *B21J 15/02* (2013.01); *B23P 19/04* (2013.01); *B62D 65/022* (2013.01); *C09J 5/06* (2013.01)

(58) Field of Classification Search
CPC ........ B62D 65/02; B62D 65/022; B21J 15/02; C09J 5/06; B29C 66/91; B29C 66/912;
(Continued)

(56) References Cited

U.S. PATENT DOCUMENTS

| 5,123,161 A | 6/1992 | Kubo et al. |
| 5,143,270 A | 9/1992 | Hamada et al. |

(Continued)

FOREIGN PATENT DOCUMENTS

| DE | 199 41 996 A1 | 3/2001 |
| DE | 10061309 A1 | 6/2002 |

(Continued)

*Primary Examiner* — George R Koch
(74) *Attorney, Agent, or Firm* — Young Basile Hanlon & MacFarlane, P.C.

(57) ABSTRACT

A system and process for gluing two components together includes measuring the temperature of one or both panels to be glued together prior to application of the glue to the panels. If the measured temperature of the panel(s) is outside a predetermined range, the system and process thermally conditions the panel(s) to bring them into the predetermined temperature range for proper adhesion and known and controlled glued panel properties for subsequent riveting of the glued panels. A control unit with predetermined reference values is in communication with the system temperature sensors and thermal conditioning devices to provide uniform gluing quality irrespective of the environmental conditions of the assembly line.

19 Claims, 1 Drawing Sheet

(51) Int. Cl.
  *B21J 15/02*   (2006.01)
  *B23P 19/04*   (2006.01)

(58) Field of Classification Search
  CPC .......... B29C 66/9121; B29C 66/91221; B29C
          66/914; B29C 66/9141; B29C 66/91411
  See application file for complete search history.

(56) References Cited

U.S. PATENT DOCUMENTS

| | | | |
|---|---|---|---|
| 5,184,766 | A | 2/1993 | Takahashi et al. |
| 5,267,683 | A | 12/1993 | Hamada et al. |
| 5,287,913 | A | 2/1994 | Dunning et al. |
| 5,400,943 | A | 3/1995 | Rossi |
| 5,940,961 | A | 8/1999 | Parete |
| 5,943,768 | A | 8/1999 | Ray |
| RE36,541 | E | 2/2000 | Rossi |
| 6,026,881 | A | 2/2000 | Durso |
| 6,170,732 | B1 | 1/2001 | Vogt et al. |
| 6,438,842 | B1 | 8/2002 | Raami |
| 6,467,675 | B1 | 10/2002 | Ozaku et al. |
| 6,493,930 | B1 | 12/2002 | Raami |
| 8,806,739 | B2 | 8/2014 | Magni et al. |
| 8,950,647 | B2 | 2/2015 | Magnano et al. |
| 9,278,410 | B2 | 3/2016 | Magnano et al. |
| 2003/0057256 | A1 | 3/2003 | Nakamura et al. |
| 2003/0115746 | A1 | 6/2003 | Saito et al. |
| 2005/0017057 | A1 | 1/2005 | Motomi et al. |
| 2005/0035175 | A1 | 2/2005 | Nakamura et al. |
| 2006/0053932 | A1 | 3/2006 | Sturm |
| 2006/0179628 | A1 | 8/2006 | Sturm |
| 2006/0236518 | A1 | 10/2006 | Baulier |
| 2006/0242823 | A1 | 11/2006 | Kilibarda |
| 2006/0245901 | A1 | 11/2006 | Yamaoka et al. |
| 2008/0116247 | A1 | 5/2008 | Kilibarda |
| 2008/0148546 | A1 | 6/2008 | Monti et al. |
| 2008/0295335 | A1 | 12/2008 | Kilibarda et al. |
| 2009/0050679 | A1 | 2/2009 | Gauggel |
| 2009/0245930 | A1 | 10/2009 | Baulier et al. |
| 2009/0285666 | A1 | 11/2009 | Kilibarda |
| 2011/0011918 | A1 | 1/2011 | Kelley |
| 2011/0265301 | A1 | 11/2011 | Kilibarda |
| 2012/0137490 | A1 | 6/2012 | Kweon et al. |
| 2012/0304446 | A1 | 12/2012 | Kilibarda |
| 2014/0123495 | A1* | 5/2014 | Hill .............. B23K 11/115 228/175 |
| 2015/0034703 | A1 | 2/2015 | Tanaka et al. |

FOREIGN PATENT DOCUMENTS

| | | |
|---|---|---|
| DE | 10164409 A1 | 7/2003 |
| EP | 1918182 A1 | 5/2008 |

\* cited by examiner

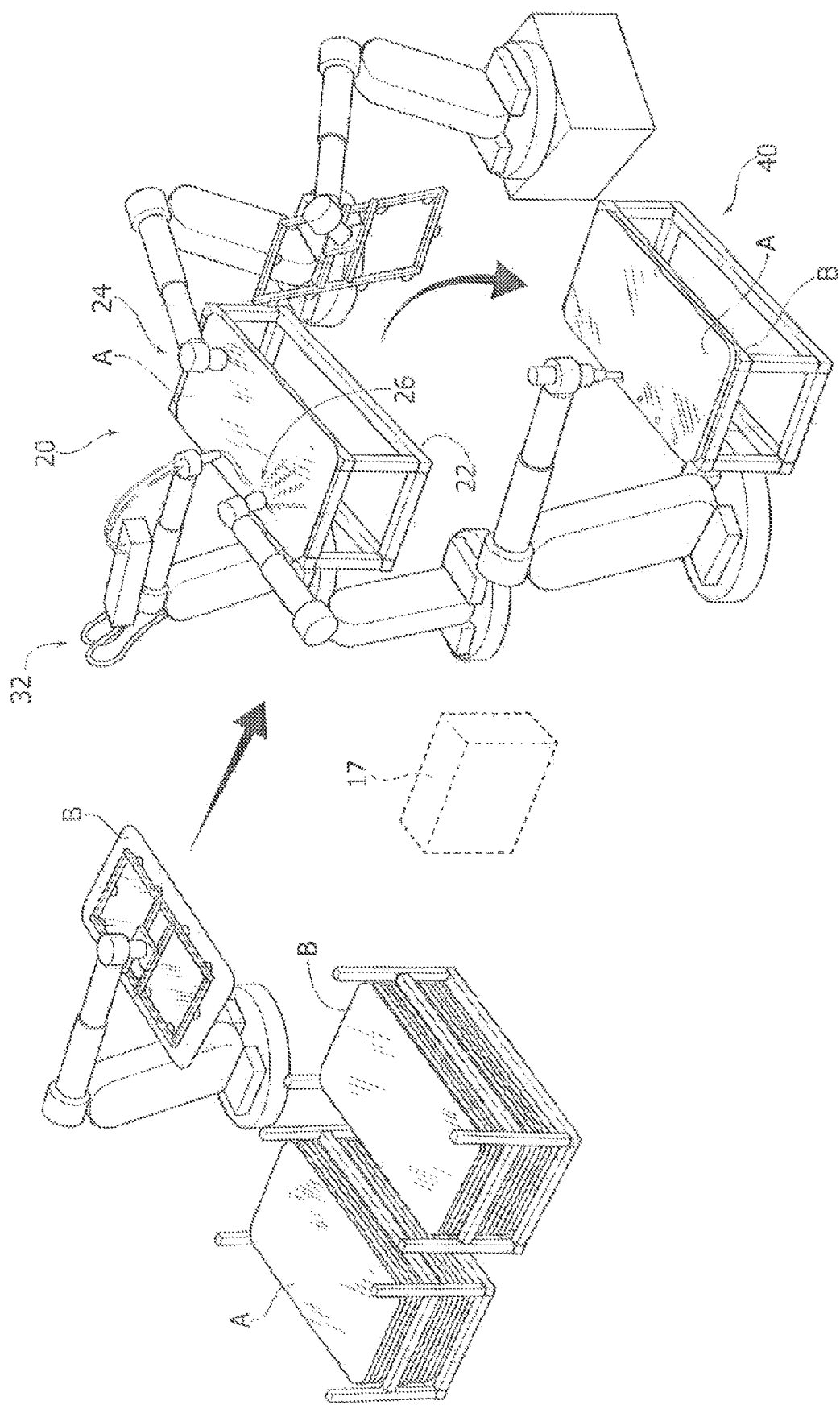

SYSTEM AND CORRESPONDING PROCESS FOR ASSEMBLING TOGETHER TWO COMPONENTS ON A VEHICLE-BODY ASSEMBLY LINE

This application is a 371 of PCT/IB2016/056454, filing date Oct. 27, 2016

TECHNICAL FIELD

The present invention relates to a system and the corresponding process for fixing together two components on a vehicle-body assembly line.

BACKGROUND

In this context, increasingly common is the use of glues instead of the more conventional techniques such as welding, above all as regards assembly of motor-vehicle bodies. Connection via glues enables, in fact, connection together also of non-metal parts and, consequently, enables introduction, in the composition of the body, of new materials, such as carbon fibres, fibreglass, and polymeric materials in general.

The process of gluing two components can also be accompanied by a process of supplementary fixing, for example a riveting process, in the case where, for specific applications, the glue alone is unable to provide the required forces of constraint. In these combined processes, the supplementary process, namely, application of the rivet in the example mentioned, is usually carried out in the same region of the two components in which the layer of glue has previously been applied. In effect, this layer of glue comes to affect the subsequent process, and this may give rise to problems regarding maintenance of a uniform quality of the pieces produced.

SUMMARY

In this context, the present applicant now proposes a solution that is improved as compared to procedures so far known, in particular that guarantees a uniform manufacturing quality.

The present applicant has found that the main problem that affects the type of process described herein is represented by the fact that the glue is very sensitive to the thermal state of the component on which it is applied so that it tends to vary almost instantaneously its conditions as soon as it is set in contact with the component, even though it is delivered in pre-set conditions, in particular at a pre-set temperature.

With particular reference to the case of a cold metal sheet, the pre-heated glue applied on the metal sheet decreases immediately in temperature and becomes for this reason more viscous.

This comes to have an adverse effect on the subsequent riveting process, given that, as compared to "standard" environmental temperatures, the riveting head now encounters greater resistance in applying the rivets, and alone is not able to compensate for the new conditions in which it is forced to operate.

In the light of the foregoing, in the process described herein the temperature of the component or components is identified as a control parameter, and the process envisages implementation of appropriate interventions for heat conditioning of the component or components and/or of the glue on the basis of the value of this parameter.

The aim is to cause the glue applied between the two glued components, at the moment of the subsequent riveting process, to always remain in a pre-set thermal state.

In general, the process described herein comprises the following steps:
  providing a first component and a second component;
  applying a layer of glue on said first component and/or said second component;
  coupling together said first and second components, with said layer of glue set in between; and
  applying on said ensemble a plurality of rivets designed to pass through said first and second components and said layer of glue.

The process is characterized in that, before applying said rivets, it moreover envisages the following steps:
  measuring the temperature of the first component and/or of the second component; and
  thermally conditioning the first component and/or the second component and/or the glue applied on the first component and/or second component via heat-conditioning means controlled on the basis of the temperature measured.

As will be seen, the above process guarantees a uniform manufacturing quality, whatever the environmental conditions in which the process is implemented.

Measurement of the temperature of the first component and/or of the second component is made directly on the component and not on the layer of glue that has been or will be applied thereon. Preferably, this measurement is made even before the glue is applied on the component or components.

Instead, the heat conditioning provided may regard only the component or components, or else the ensemble constituted by the glue applied to each individual component, or again the ensemble constituted by the two components and the layer of glue set in between. In the cases where the conditioning is made on the component without glue, it is in any case made on the parts or portions of the component where the glue will then be applied.

BRIEF DESCRIPTION OF THE DRAWINGS

The invention is best understood from the following detailed description when read in conjunction with the accompanying drawings.

FIG. 1 is a schematic perspective view of an example of the invention.

DETAILED DESCRIPTION

By way of example, a possible application of the process disclosed herein will now be described.

FIG. 1 illustrates a system of assembly that envisages a first or gluing station 20 for gluing two components A and B, and, downstream, a riveting station 40, which operates on the same components for completing mutual fixing thereof.

In the gluing station 20, the two components A and B are first connected together via application of a layer of glue.

The gluing station 20 has conventional means 32 for applying the glue to at least one of component A or component B shown in FIG. 1. In various preferred embodiments, as in the one illustrated, these conventional means are represented by a manipulator robot, which carries a head for controlled delivery of the glue. These conventional means may, in any case, clearly be constituted by any other device or system conventionally used in the art for the functions referred to.

The gluing station 20 comprises a basic structure 22 on which the component A is initially set. Sensor means 24 of the station are prearranged for measuring the temperature of the component in one or more pre-set points.

The system comprises heat-conditioning means 26 and a control unit 17 designed to govern these means according to the temperature measured.

The heat-conditioning means described herein are designed to intervene whenever the temperatures of the two components to be fixed together are different from a pre-set temperature, to bring the two components to this latter temperature. As has already been seen, the heat-conditioning provided may regard either the individual components, with or without glue, or else the ensemble constituted by the two components and the layer of glue set in between.

This operation has the function of causing the glue applied between the two glued components at the moment of the subsequent riveting process to be always in a pre-set thermal state, and hence the riveting process to be always performed in known and predetermined conditions, whatever the current specific environmental conditions. In this way, there will be no need to carry out any adjustment of the riveting head; rather, this may for example use the same force of application of the rivet, in a constant way.

In the example illustrated, the conditioning means are operated, when necessary, either on the component A alone, after this has been set on the structure 22, or on the ensemble constituted by the components A and B glued together.

The heat-conditioning means 26 may envisage either a heating unit or a cooling unit, or again a unit of each type. In the case of a heating unit, this may be constituted by one or more infrared emitters, air blowers, or blowers of heated gas, etc. In the case of a cooling unit, this may be constituted, for example, by one or more fans. Preferably, these heat-conditioning means 26 are carried by mobile structures, for example, robot arms, to be able to concentrate selectively their action on different parts or portions of the component.

The sensor means 24 may, for example, be infrared sensors. As in the example illustrated, preferably the sensors are carried by a mobile structure, for example a robot arm, to be able to detect the temperature in different points of the panel. The sensors in question may in any case also be carried by a fixed structure, and in this case they are designed to detect the temperature always more or less in one and the same point of the various components. In alternative embodiments, these sensor means are, instead, constituted by a thermographic camera via which a complete mapping of the temperature is obtained for extensive portions of the components.

The apparatus clearly comprises a control system for implementation of the process described. The control unit 17 referred to above in general forms part of the control system of the apparatus. It may be constituted by one or more modules, physically connected together or separate, and set in the proximity of, or else in a remote position from, the sensors and/or actuators that are involved in the process that the above control unit 17 controls.

In various embodiments, the control unit 17 has, stored within it, one or more reference values and is configured for setting in relation the temperatures measured with the above reference values, and for determining the active and inactive states of the heat-conditioning means 26 on the basis of the relation determined between the temperatures measured and the reference values. In various preferred embodiments, the control unit 17 has a temperature range stored within it, and is configured for controlling the action of the heat-conditioning means 26 if and as long as the temperature measured on the component does not fall within this range.

Furthermore, the control unit 17 can also be configured for adjusting the operating parameters of the aforesaid heat-conditioning means 26 as a function of the temperatures measured in order to adapt the times of the operations of the system to pre-set cycle times, irrespective of the actual temperatures detected on the components. The parameters in question may be represented by the electric power consumption, the rate of displacement of the conditioning means with respect to the panel, the duration of the action of these means, etc.

By way of example, in the stage of setting up the system, it is hence possible to identify, for the different temperatures at which the components could be during operation that do not correspond to the aforesaid pre-set state, a series of active states and of corresponding operating parameters of the heat-conditioning means that enable the panel to be brought into the pre-set state, within pre-set times. This setting-up stage may, preferably, generate one or more control maps that associate, to a set of values indicating the temperatures measured, values and/or states corresponding to one or more of the operating parameters of the conditioning means.

To return to the process schematically represented in FIG. 1, after the two components A and B have been glued together and treated thermally as referred to above, they are finally transferred to the riveting station 40 for application of the rivets. This riveting station 40 comprises a device for application of the rivets of any type conventionally used in the art.

In the light of the foregoing, the system described herein hence enables performance of the operations always in pre-set conditions, whatever the current environmental conditions in which the assembly line is operating, thus guaranteeing a uniform and constant manufacturing quality.

Of course, without prejudice to the principle of the invention, the details of construction and the embodiments may vary, even significantly, with respect to what is illustrated herein purely by way of non-limiting example, without thereby departing from the scope of the invention, as this is defined in the annexed claims.

The invention claimed is:

1. A process for fixing together two components on a vehicle-body assembly line, comprising the steps of:
providing a first component and a second component;
applying a layer of glue on at least one of said first component or said second component;
coupling together said first and second components, with said layer of glue set in between; and
applying on said coupled first and second components a plurality of rivets designed to pass through said first and second components and said layer of glue;
said process being characterized in that, before applying said rivets, said process further comprising:
measuring a temperature of at least one of the first component or of the second component; and
thermally conditioning at least one of the first component, or the second component, or the glue applied on said at least one of the first component or the second component via heat-conditioning means controlled on the basis of the temperature measured, wherein said applied layer of glue on said at least one of said first component or said second component is in a pre-set thermal state and respective of said plurality of applied rivets pass through said first component, said second component, and said layer of glue when said layer of glue is in said pre-set thermal state.

2. The process according to claim 1 wherein said step of measuring the temperature of said at least one of the first component or the second component is carried out directly on said at least one of the first component or said second component and not on the layer of glue that has been, or will be, applied thereon.

3. The process according to claim 2 wherein said thermally conditioning step is carried out on portions of the at least one of the first component or the second component where the glue has been applied, or will be applied.

4. The process according to claim 3 further including a control unit, the process further comprising:
   the control unit setting in relation the temperature measured with one or more reference values stored in the control unit; and
   the control unit determining an active state or an inactive state of said heat-conditioning means according to the set relation.

5. The process according to claim 1 wherein said thermally conditioning step is carried out on a portion of the at least one of the first component or the second component where the glue has been applied, or will be applied.

6. The process according to claim 1 wherein said step of measuring the temperature is carried out before the layer of glue is applied on said at least one of the first component or the second component.

7. The process according to claim 6 wherein said heat-conditioning means act on said layer of glue applied on said at least one of the first component or said second component.

8. The process according to claim 1 further including a control unit, the process further comprising:
   the control unit setting in relation the temperature measured with one or more reference values stored in the control unit; and
   the control unit determining an active state or an inactive state of said heat-conditioning means according to the set relation.

9. The process according to claim 1 wherein said heat-conditioning means includes a heating unit, the thermal conditioning step further comprises the heating unit heating said at least one of the first component or said second component.

10. The process of claim 1 wherein measuring the temperature and thermally conditioning steps occur prior to applying said layer of glue to said at least one of the first component or said second component.

11. The process of claim 10 wherein the thermal conditioning is conducted on at least one of the first or the second components that will receive the layer of glue.

12. A system for assembly on a vehicle-body assembly line, the system comprising:
   a station for gluing together a first component and a second component, the gluing station including a device operable to apply a layer of glue on at least one of the first component or said second component;
   a station for riveting together the first component and the second component, the riveting station including a device operable to apply a plurality of rivets through said first and second components coupled together with said layer of glue set in between;
   at least one temperature sensor operable to detect a temperature of at least one of the first component or said second component;
   at least one heat-conditioning unit; and
   a control unit configured for controlling said at least one heat-conditioning unit in order to heat-condition at least one of said first component, or said second component, or the layer of glue applied on said at least one of the first component or said second component on the basis of the temperature detected by said at least one temperature sensor, wherein said layer of glue applied on said at least one of said first component or said second component is in a pre-set thermal state and respective of said plurality of applied rivets pass through said first component, said second component, and said layer of glue when said layer of glue is in said pre-set thermal state.

13. The system according to claim 12, wherein said at least one temperature sensor and said at least one heat-conditioning unit are positioned in said gluing station.

14. The system according to claim 12 wherein said at least one heat-conditioning unit is supported by a manipulator robot.

15. The system according to claim 12 wherein said at least one heat-conditioning unit comprises one of an infrared lamp or an air blower.

16. The system according to claim 12 wherein said at least one temperature sensor comprises one of infrared sensors or at least one thermographic camera.

17. The system according to claim 12 wherein said device for applying said glue comprises a manipulator robot having a head operable to control a delivery of the glue.

18. A process for fixing together two components on a vehicle-body assembly line, comprising the steps of:
   providing an uncoupled first component and a second component;
   measuring a temperature of at least one of the first component or the second component to receive a layer of glue;
   selectively thermally conditioning to a predetermined pre-set temperature the at least one of the first component or the second component to receive the layer of glue, the selective thermal conditioning based on the measured temperature;
   applying the layer of glue on the thermally conditioned at least one of the first component or said second component, the layer of glue being in a predetermined pre-set thermal state;
   coupling together the first and second components, the layer of glue positioned between the first and the second components; and
   installing a plurality of rivets through the first component, the second component, and the layer of glue in the predetermined pre-set thermal state.

19. The process of claim 18 wherein the step of selectively thermally conditioning further comprises one of:
   applying heat by a heating unit; or
   applying forced air by a cooling unit.

* * * * *